(12) United States Patent
Omiya et al.

(10) Patent No.: US 6,485,062 B2
(45) Date of Patent: Nov. 26, 2002

(54) MULTI-CHANNEL ROTARY JOINT

(75) Inventors: Junji Omiya, Osaka (JP); Nobuhito Hirakawa, Sanda (JP); Isao Tanaka, Sanda (JP); Yusuke Kamon, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

(21) Appl. No.: 09/898,847

(22) Filed: Jul. 3, 2001

(65) Prior Publication Data

US 2002/0017785 A1 Feb. 14, 2002

(30) Foreign Application Priority Data

Jul. 3, 2000 (JP) .......................................... 2000-200433

(51) Int. Cl.[7] ............................................... F16L 39/04
(52) U.S. Cl. ................................ 285/121.1; 285/121.6; 285/121.3; 285/96; 285/106
(58) Field of Search ......................... 285/120.1, 121.1, 285/121.3, 121.6, 110, 96, 106

(56) References Cited

U.S. PATENT DOCUMENTS

| | | | | |
|---|---|---|---|---|
| 3,351,360 A | * | 11/1967 | Faccou | 285/123.1 |
| 4,111,467 A | * | 9/1978 | de Fremery | 285/121.3 |
| 4,405,162 A | * | 9/1983 | Williams | 285/121.3 |
| 4,561,679 A | * | 12/1985 | Choate | 258/106 |
| 4,602,806 A | * | 7/1986 | Saliger | 285/98 |
| 4,669,758 A | * | 6/1987 | Feller et al. | 258/121.1 |
| 4,828,292 A | * | 5/1989 | Jansen | 285/121.3 |
| 5,895,077 A | * | 4/1999 | Sigmundstad | 285/96 |
| 6,234,540 B1 | * | 5/2001 | Drijver | 285/121.1 |

* cited by examiner

*Primary Examiner*—Eric K. Nicholson
(74) *Attorney, Agent, or Firm*—Koda & Androlia (57) ABSTRACT

A multi-channel rotary joint comprising-elastic seal rings each having an annular groove that are used to form a low-pressure channel space and a high-pressure channel space between the opposing peripheral surfaces of a joint housing and a rotator that rotates inside the joint housing. Seal rings that seal the low-pressure channel space which forms part of a vacuum suction route are engaged with and supported by one of the opposing peripheral surfaces such that annular grooves are disposed symmetrically and opening into spaces adjacent to the low-pressure channel space. The seal rings that seal the high-pressure channel space which forms part of a pressurized fluid supply route are engaged with and supported by one of the opposing peripheral surfaces such that the annular grooves are disposed symmetrically and opening into this high-pressure channel space.

4 Claims, 6 Drawing Sheets

MULTI-CHANNEL ROTARY JOINT

BACKGROUND OF THE INVENTION

1. Field of the Invention

The present invention relates to a multi-channel rotary joint that is mounted, for example, at the arm joint of an industrial robot used as a wafer conveyance means in a semiconductor manufacturing apparatus, where the rotary joint is used to allow a plurality of fluids of different pressure (such as a positive pressure fluid and a negative pressure fluid) to flow along separate routes between two relative rotational members that constitute an arm joint or the like.

2. Prior Art

In an industrial robot used as a wafer conveyance means in a semiconductor manufacturing apparatus, for example, a rotary joint is necessary for allowing a plurality of fluids of different pressure to flow between two relative rotational members that make up an arm joint (a working arm member and a power source arm member that rotatably supports the working arm member).

More specifically, the working arm member is provided with a plurality of rotary fluid passages connected to a vacuum chucking device for holding a workpiece (such as a silicon wafer), a fluid device for controlling the position of the working component, or the like, while the power source arm member is provided with a plurality of stationary fluid passages connected to a vacuum pump, a compressor, or another such power generation device for operating manipulation and control devices, and a rotary joint having a plurality of fluid routes is necessary for rotatably and independently linking these rotary fluid passages and stationary fluid passages.

One such rotary joint that has been proposed is designed such that the relative rotational portions of the channels formed between a joint housing and a rotator rotatably supported around the inner periphery of the joint housing are sealed with mechanical seals or elastic seal rings between the opposing peripheral surfaces of the joint housing and the rotator.

However, with a mechanical seal, a seal ring provided for the joint housing and a seal ring provided for the rotator are pressed into contact with each other by springs, creating a seal through the relative rotational sliding action of the two seal rings, and this construction took up a large installation space. Therefore, with a rotary joint that makes use of mechanical seals, if many channels are to be formed between the joint housing and the rotator, then the rotary joint must be made larger than necessary in order to leave enough space for the installation of the mechanical seals, and this hinders efforts to make the robot more compact.

Also, since the seal rings of the mechanical seals are powerfully pressed into contact with each other, if there are many channels (i.e., mechanical seals) installed, then there is high rotational resistance between the joint housing and the rotator, the load and resistance with respect to the movement of the robot arm increases, and there may be an adverse effect on the robot performance.

In contrast, the above problems are not encountered with a rotary joint that makes use of elastic seal rings such as O-rings as its sealing means. However, in this rotary joint, the sealing force is obtained via the elastic contact force of the seal rings that applies against the opposing peripheral surfaces of the joint housing and the rotator. Accordingly, stable sealing cannot be obtained for high-pressure fluids or negative pressure fluids, and such a rotary joint cannot comply adequately with fluctuations in fluid pressure.

SUMMARY OF THE INVENTION

Accordingly, it is an object of the present invention to provide a multi-channel rotary joint in which the advantages to use elastic seal rings (such as compact sizing of the joint) is maintained without any drawbacks (for instance, a poor sealing performance).

It is another object of the present invention to provide a multi-channel rotary joint that allows a plurality of fluids of different pressure (such as fluids of positive and negative pressure) to flow under control as desired in separated routes between relative rotational members without mixing the fluids.

It is still another object of the present invention to provide a practical multi-channel rotary joint that is used, to advantage, in arm joints and so forth of industrial robots such as a wafer conveyance robot.

The above objects are accomplished by a unique structure for a multi-channel rotary joint that comprises:

a joint housing;

a rotator rotatably installed in the joint housing;

a plurality of elastic seal rings disposed in a row in an axial direction of the rotator so as to be between opposing peripheral surfaces of the joint housing and the rotator, wherein each of the elastic seal rings is comprised of an annular main body and cylindrical inner and outer peripheral lips that protrude axially from the annular main body and are brought into an elastically pressing contact with the opposing peripheral surfaces;

a low-pressure channel space and a high-pressure channel space formed between the opposing peripheral surfaces and sealed by two opposing elastic seal rings, wherein two elastic seal rings that seal the low-pressure channel space being engaged with and supported by one of the opposing peripheral surfaces such that annular grooves between inner and outer peripheral lips of the elastic seal rings are disposed symmetrically and open into spaces adjacent to the low-pressure channel space, and two elastic seal rings that seal the high-pressure channel space being engaged with and supported by one of the opposing peripheral surfaces such that annular grooves between inner and outer peripheral lips of the elastic seal rings are disposed symmetrically and open into the high-pressure channel space; and a low-pressure channel and a high-pressure channel provided between the joint housing and the rotator, wherein a fluid lower in pressure than a space adjacent to the low-pressure channel space is allowed to flow into the low-pressure channel that communicates with the low-pressure channel space, and a fluid higher in pressure than a space adjacent to the high-pressure channel space is allowed to flow into the high-pressure channel that communicates with through the high-pressure channel space.

With the above structure, the low-pressure channel is used as a vacuum suction route through which a negative pressure fluid flows, and the high-pressure channel is used as a pressurized fluid supply route through which a positive pressure fluid flows. At least one low-pressure channel space can be provided adjacent to a high-pressure channel space; and in this case, the elastic seal ring that seals the low-pressure channel space can be used also as an elastic seal ring that seals the high-pressure channel space. Also, an electrical wire passage hole can be formed along the axial line of the rotator so as to penetrate through the joint housing and the rotator. It is preferable to install a rotary connector that connects electrical wiring at the end of the electrical wire passage hole.

DETAILED DESCRIPTION OF THE INVENTION

FIGS. 1 to 6 illustrate an embodiment of the present invention. The multi-channel rotary joint of the present invention in this embodiment is mounted, for example, between the relative rotational members (between the power source arm member and the working arm member) that make up the arm joint of an industrial robot (such as a wafer conveyance robot).

Figure 1:
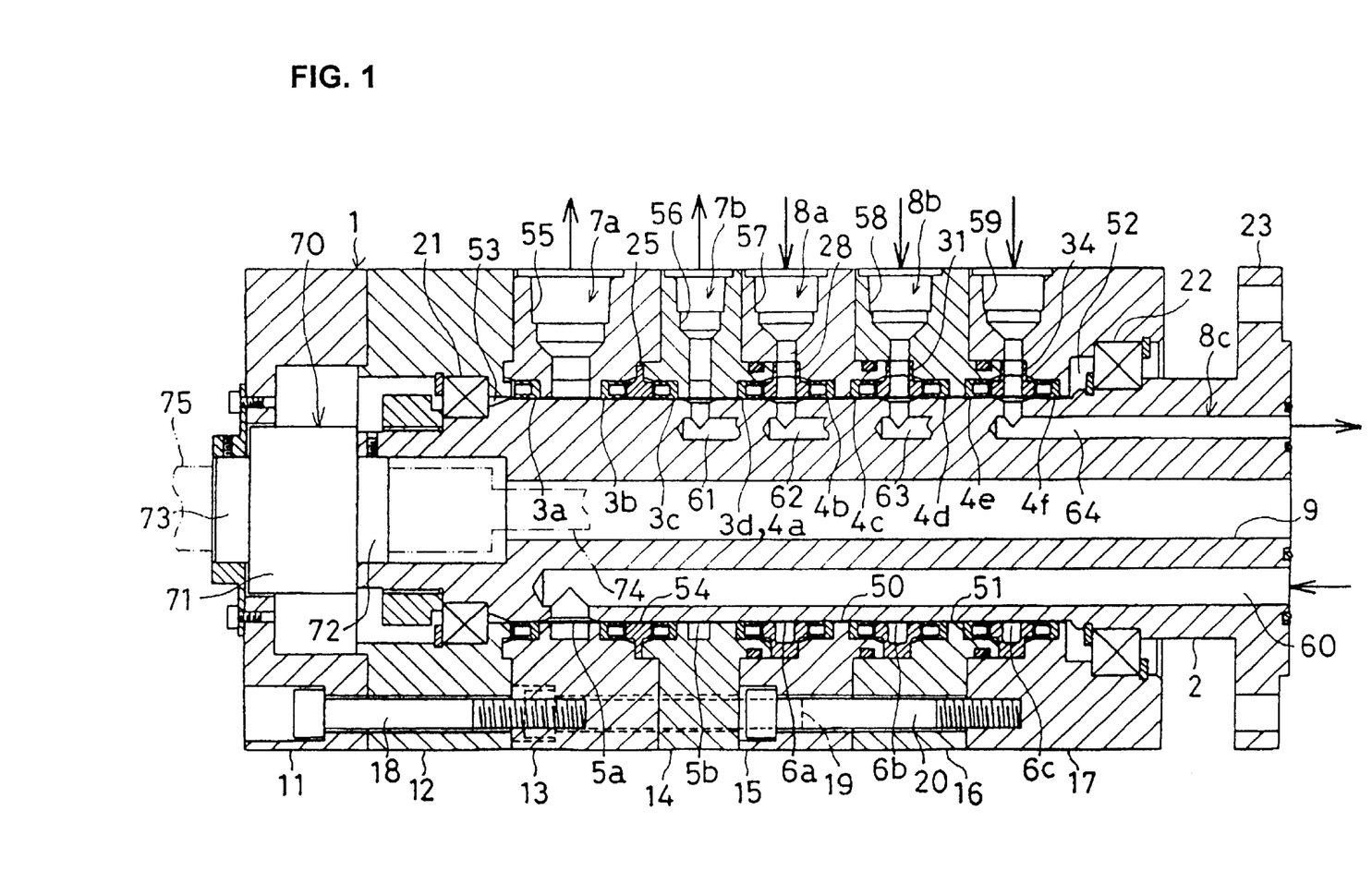
FIG. 1 shows a vertical side cross section of the multi-channel rotary joint according to one embodiment of the present invention.

As seen from FIG. 1, the rotator 2 is rotatably installed in the joint housing 1, and the annular space between the opposing peripheral surfaces of the joint housing 1 and rotator 2 is divided by a plurality of elastic seal rings 3 (3a through 3d) and 4 (4a through 4f) to form a plurality of low-pressure channel spaces 5 (5a and 5b) and high-pressure channel spaces 6 (6a through 6c). In addition, a plurality of low-pressure channels 7 (7a and 7b) and high-pressure channels 8 (8a through 8c) are formed so as to communicate with the channel spaces 5 and 6, and an electrical wire passage hole 9 is formed so as to penetrate through the rotator 2.

In the following description, "left" and "right" refer to the left and right sides in FIG. 1.

As seen from FIG. 1, the joint housing 1, which is attached to a power source arm member, is comprised of seven sections 11, 12, 13, 14, 15, 16 and 17 that arranged in the axial direction (left and right) so as to form a cylindrical structure. These segments will hereinafter be referred to, in order from the left side, as the "first joint housing section 11," "second joint housing section 12," "third joint housing section 13," "fourth joint housing section 14," "fifth joint housing section 15," "sixth joint housing section 16," and "seventh joint housing section 17."

As shown in FIG. 1, these joint housing sections 11 to 17 are concentrically linked and integrated by a first bolt 18, a second bolt 19, and a third bolt 20. The first bolt 18 passes through the first and second joint housing sections 11 and 12 and is threaded into the third joint housing section 13. The second bolt 19 passes through the third and fourth joint housing sections 13 and 14 and is threaded into the fifth joint housing section 15. The third bolt 20 passes through the fifth and sixth joint housing sections 15 and 16 and is threaded into the seventh joint housing section 17.

The first joint housing section 11 is in the form of a bottomed hollow cylinder, while the other joint housing sections 12 to 17 are in the form of hollow cylinders having the same outside diameter as the first joint housing section 11.

The rotator 2, as shown in FIG. 1, is a solid cylindrical structure that is rotatably and concentrically supported by the inner periphery of the joint housing I via bearings 21 and 22. The bearings 21 and 22 are mounted between the outer periphery at both ends of the rotator 2 and the inner periphery of the second and seventh joint housing sections 12 and 17 of the joint housing 1. The rotator 2 is attached to the working arm member concentrically with the rotational axis thereof by means of an attachment flange 23 protruding to the right from the seventh joint housing section 17.

As shown in FIG. 1, elastic seal rings 3 (3a through 3d) and elastic seal rings 4 (4a through 4f) are disposed in a row in the left and right direction in the annular space that is defined by the bearings 21 and 22 and the opposing peripheral surfaces of the joint housing 1 and rotator 2. In the shown embodiment, two low-pressure channel spaces 5a and 5b are formed by four elastic seal rings 3a through 3d disposed in a row in the left-side region of the annular space, and the three high-pressure channel spaces 6a through 6c are formed by six elastic seal rings 4a through 4f disposed in a row in the right-side region of the annular space.

In the following description, the elastic seal rings 3a through 3d that form the low-pressure channel spaces 5a and 5b are called, in order from the left side, the "first low-pressure seal ring 3a," "second low-pressure seal ring 3b," "third low-pressure seal ring 3c," and "fourth low-pressure seal ring 3d."

Also, the low-pressure channel space 5a sealed by the first and second low-pressure seal rings 3a and 3b is called the "first low-pressure channel space 5a," while another low-pressure channel space 5b sealed by the third and fourth low-pressure seal rings 3c and 3d is called the "second low-pressure channel space 5b."

The elastic seal rings 4a through 4e that form the high-pressure channel spaces 6a through 6c are called, in order from the left side, the "first high-pressure seal ring 4a," "second high-pressure seal ring 4b," "third high-pressure seal ring 4c," "fourth high-pressure seal ring 4d," "fifth high-pressure seal ring 4e," and "sixth high-pressure seal ring 4f."

As to the high-pressure channel spaces 6a through 6c, the one sealed by the first and second high-pressure seal rings 4a and 4b is called the "first high-pressure channel space 6a," the one sealed by the third and fourth high-pressure seal rings 4c and 4d is called the "second high-pressure channel space 6b," and the one sealed by the fifth and sixth high-pressure seal rings 4e and 4f is called the "third high-pressure channel space 6c."

As shown in FIGS. 1 to 5, the elastic seal rings 3a through 3d and 4a through 4f are engaged with and supported by annular recesses 24, 26, 27, 29, 30, 32, 33, 35 and 36 formed in the inner periphery of the joint housing 1.

Figure 2:
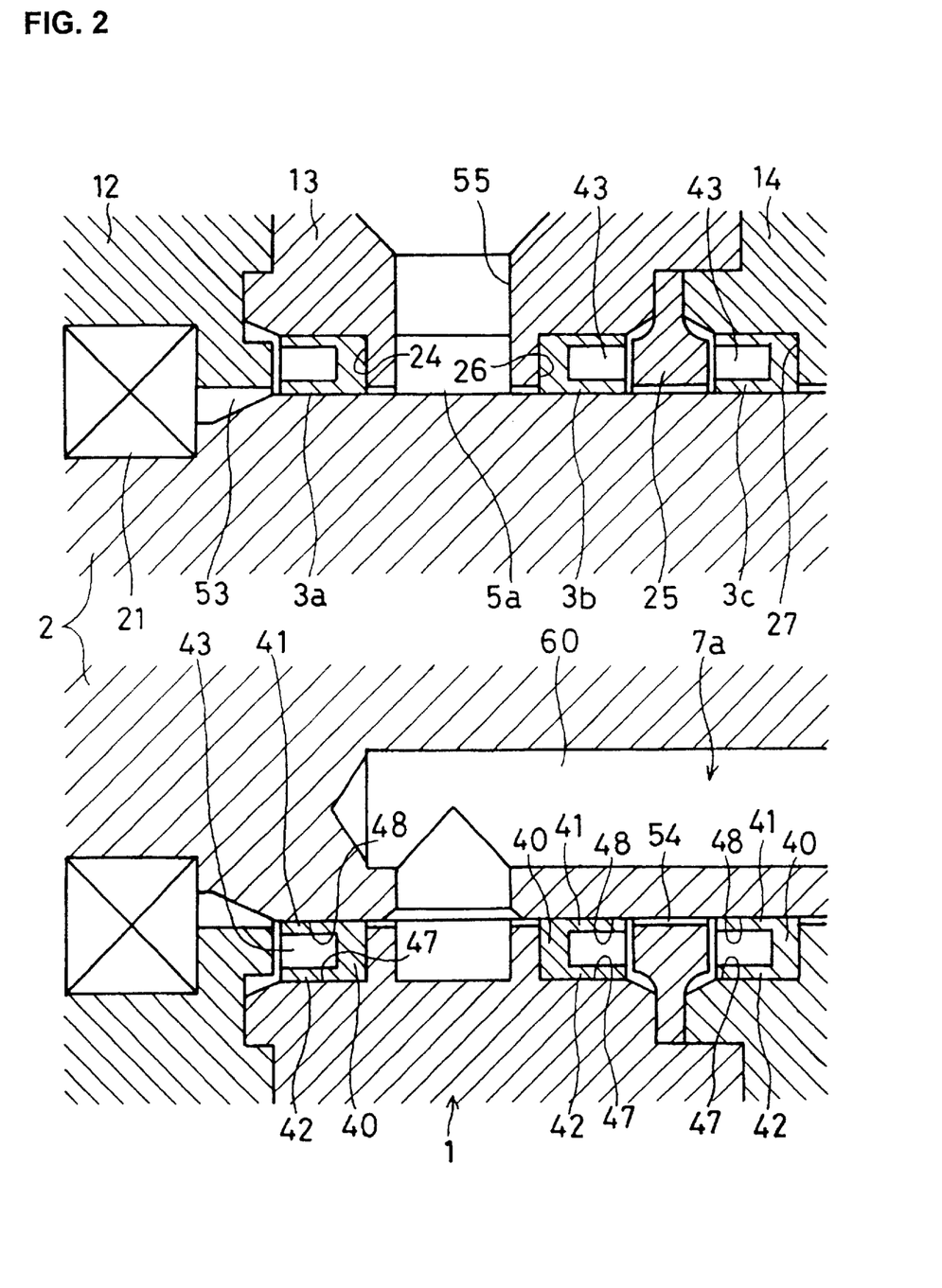
FIG. 2 is an enlarged view of the main components of FIG. 1.

More specifically, as shown in FIG. 2, the first low-pressure seal ring 3a is engaged with and supported by the annular recess 24 formed between the second joint housing section 12 and the third joint housing section 13. The second low-pressure seal ring 3b, as shown in FIG. 2, is engaged with and supported by the annular recess 26 formed between the third joint housing section 13 and a first annular member 25 mounted between the third and fourth joint housing sections 13 and 14. The third low-pressure seal ring 3c, as shown in FIGS. 3 and 5, is engaged with and supported by the annular recess 27 formed between the first annular member 25 and the fourth joint housing section 14.

Figure 3:
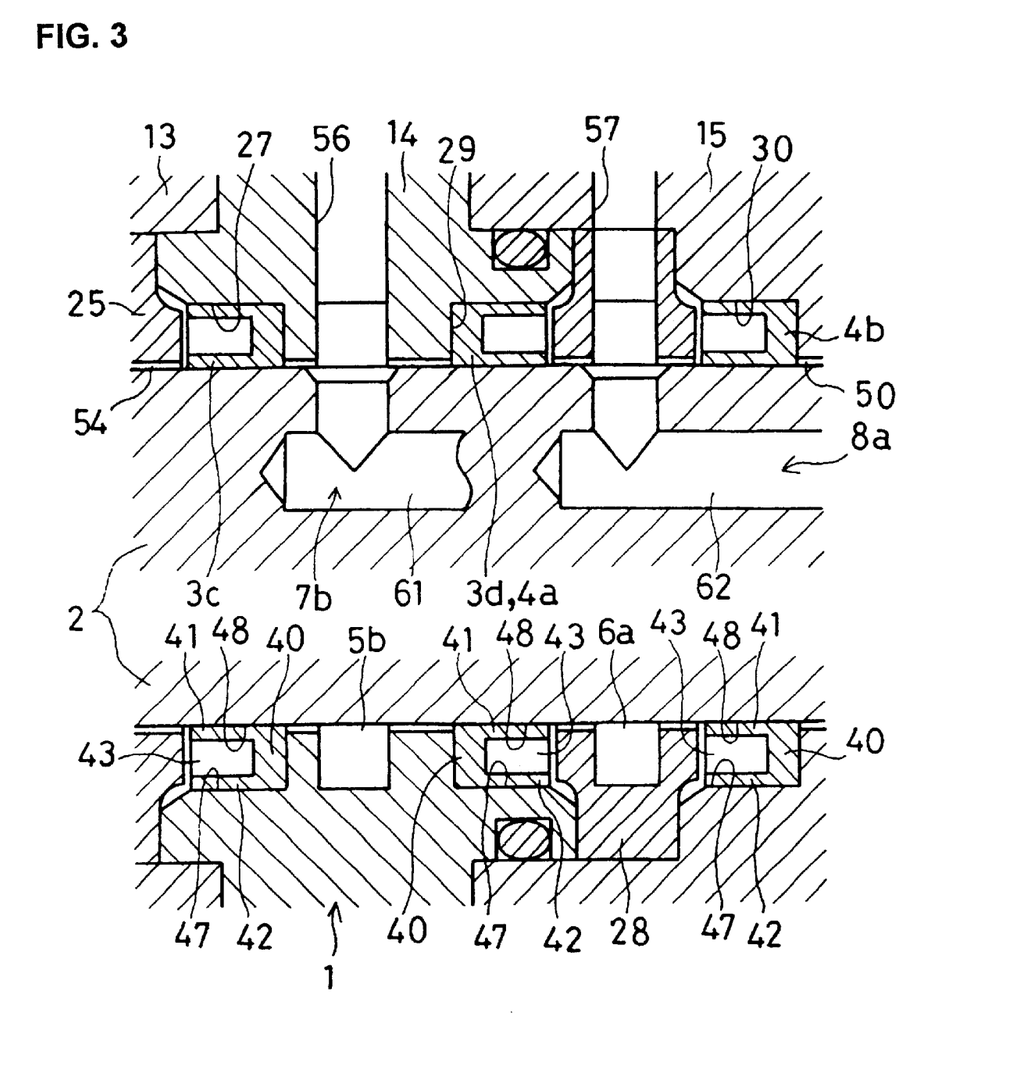
FIG. 3 is enlarged view of another main components of FIG. 1.
Figure 5:
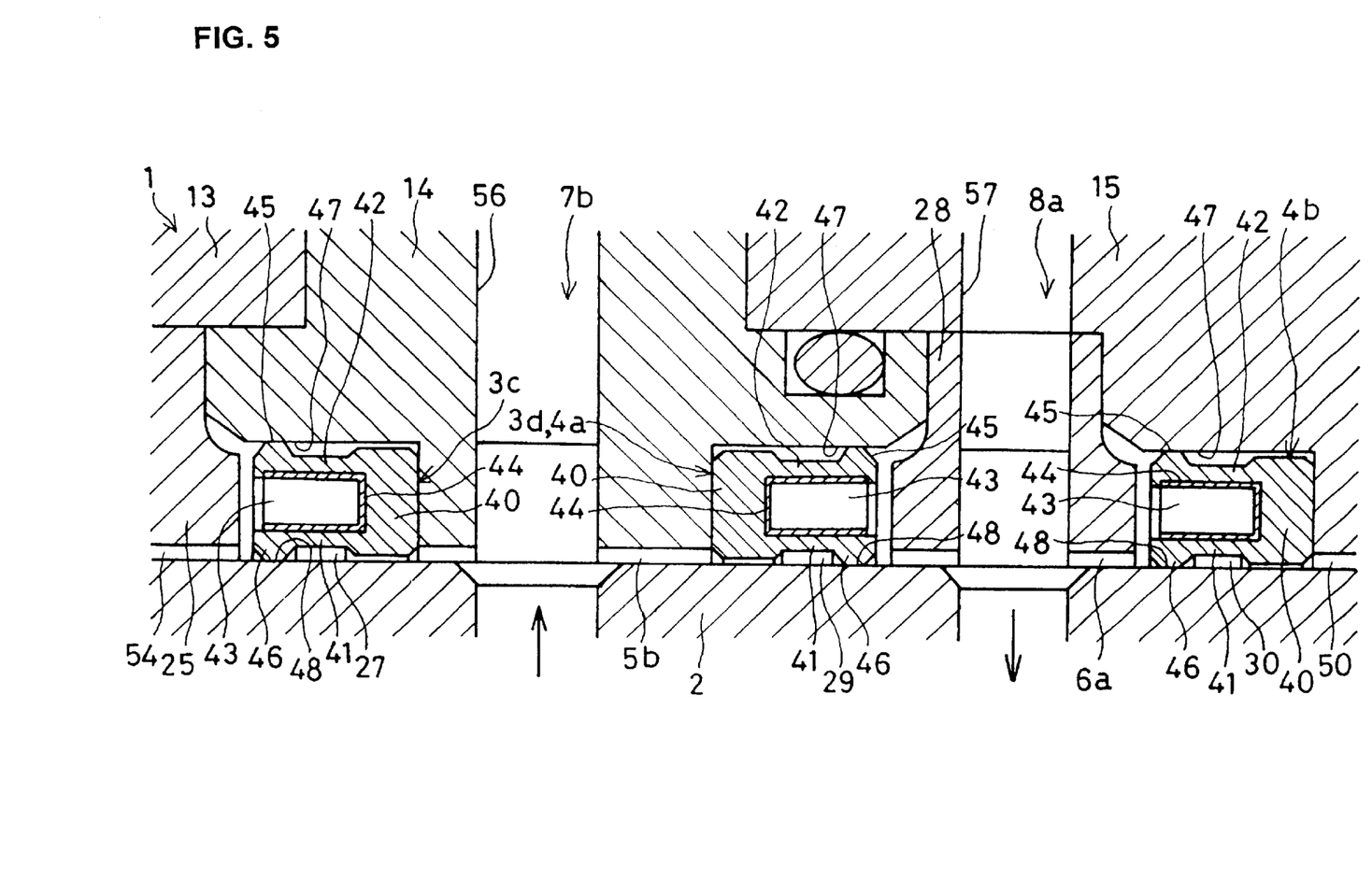
FIG. 5 is an enlarged detail view of FIG. 3.

The fourth low-pressure seal ring 3d and the first high-pressure seal ring 4a (the seal rings 3d and 4a serve double duty, as discussed below), as shown in FIGS. 3 and 5, are engaged with and supported by the annular recess 29 formed between the fourth joint housing section 14 and a second annular member 28 mounted between the fourth and fifth joint housing sections 14 and 15.

Figure 4:
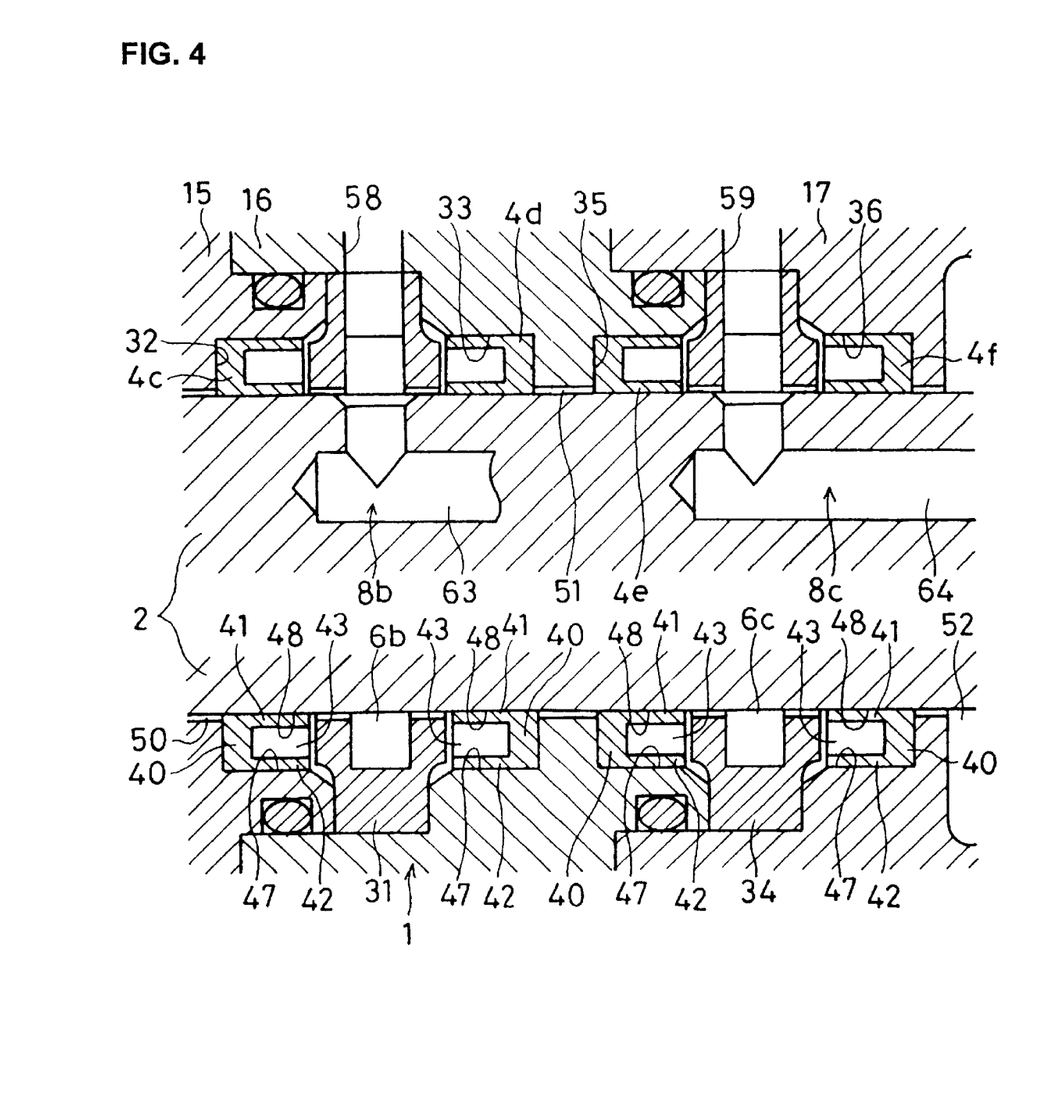
FIG. 4 is enlarged view of yet another main components of FIG. 1.

The second high-pressure seal ring 4b, as shown in FIGS. 3 and 5, is engaged with and supported by the annular recess 30 formed between the second annular member 28 and the fifth joint housing section 15. The third high-pressure seal ring 4c, as shown in FIG. 4, is engaged with and supported by the annular recess 32 formed between the fifth joint housing section 15 and a third annular member 31 mounted between the fifth and sixth joint housing sections 15 and 16. The fourth high-pressure seal ring 4d, as shown in FIG. 4, is engaged with and supported by the annular recess 33 formed between the third annular member 31 and the sixth joint housing section 16. The fifth high-pressure seal ring 4e, as shown in FIG. 4, is engaged with and supported by the annular recess 35 formed between the sixth joint housing section 16 and a fourth annular member 34 mounted between the sixth and seventh joint housing sections 16 and 17. The sixth high-pressure seal ring 4f, as shown in FIG. 4, is engaged with and supported by the annular recess 36 formed between the fourth annular member 34 and the seventh joint housing section 17.

Figure 6:
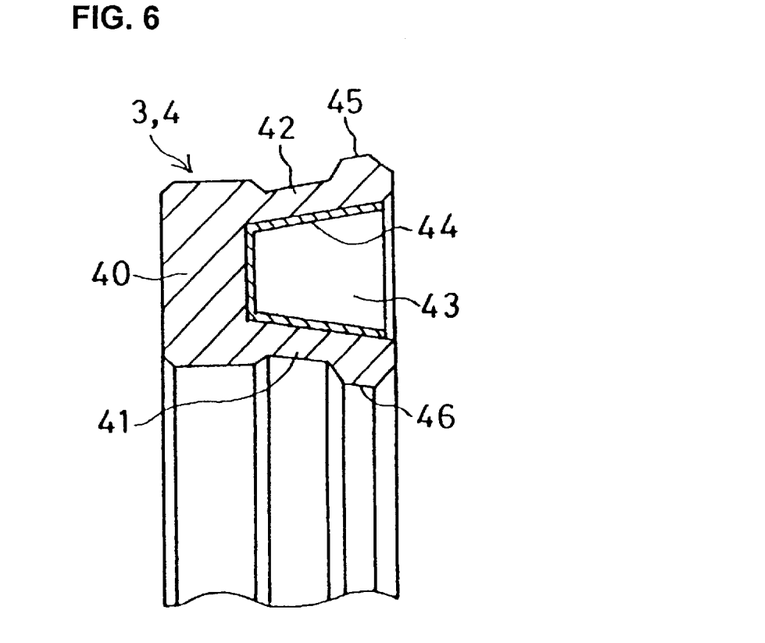
FIG. 6 is a vertical cross sectional side view of a part of the elastic seal ring used in the rotary joint of the present invention.

The elastic seal rings 3 (3a through 3d) and 4 (4a through 4f) are common members having the same structure. As shown in FIG. 6, each of these seal rings is an annular body having a substantially U-shaped (or angled U-shaped) cross section and is comprised of an annular main body 40, cylindrical inner and outer peripheral lips 41 and 42 protruding in the axial direction from the main body 40, and a spring member 44 installed in an annular groove 43 defined by the inner and outer peripheral lips 41 and 42.

The annular body with a substantially U-shaped cross section and consisting of the main body 40 and the inner and outer peripheral lips 41 and 42 is molded from a plastic, rubber, or other such elastic material.

The elastic material that serves as the structural material of the annular body is selected according to the sealing conditions. For instance, a heat resistant elastic material is used when the fluid to be sealed by the elastic seal rings 4 will be very hot, and a corrosion resistant elastic material is used when the fluid will be corrosive, but in general, it is favorable to use a fluororesin such as polytetrafluoroethylene (PTFE) having self-lubricity and low friction (a coefficient of friction of about 0.2 to 0.3), or an elastic composite obtained by blending this material with at least one type of filler such as glass fiber, carbon fiber, or molybdenum disulfide. The material can be, for example, an elastic composite with low friction, excellent wear resistance, and so forth, obtained by blending glass fiber and molybdenum disulfide or a polyimide resin with polytetrafluoroethylene.

The elastic seal rings 3 (3a through 3d) and 4 (4a through 4f) are engaged with and supported by the annular recesses 24, 26, 27, 29, 30, 32, 33, 35 and 36 so that the annular seals 45 protruding from the outer peripheral distal end of the outer peripheral lip 42 is made to be in elastic contact with bottoms 47 of the annular recesses 24, 26, 27, 29, 30, 32, 33, 35 and 36, which are the inner peripheral surface of the joint housing 1, and annular seals 46 protruding from the inner peripheral distal end of the inner peripheral lip 41 are made to be in elastic contact with portions 48 opposing these bottoms 47 around the outer peripheral surface of the rotator 2.

The spring members 44 are flat springs that have been bent into a U-shape and are installed in the annular grooves 43 of the elastic seal rings 3 and 4. These spring members 44 bias the inner and outer peripheral lips 41 and 42 in the direction in which they spread out in their radial direction. More specifically, the spring members 44 raise the contact surface pressure of the annular seals 45 and 46 against the sealing surfaces (the bottoms 47 of the annular recesses 24, 26, 27, 29, 30, 32, 33, 35 and 36 and the opposing outer peripheral surface portions 48 of the rotator 2).

The two high-pressure seal rings that seal each high-pressure channel space 6a through 6c are disposed in symmetry, with the annular grooves 43 thereof opening into the high-pressure channel space 6.

More specifically, as shown in FIGS. 3 and 5, the first and second high-pressure seal rings 4a and 4b are disposed such that the open sides of the annular grooves 43 face each other with the first high-pressure channel space 6a in between, and seal off the first high-pressure channel space 6a from the adjacent spaces on both sides thereof (the second low-pressure channel space 5b and the space 50 between the second and third high-pressure seal rings 4b and 4c).

Likewise, as shown in FIG. 4, the third and fourth high-pressure seal rings 4c and 4d are disposed in symmetry, with the open sides of the annular grooves 43 thereof facing each other with the second high-pressure channel space 6b in between, and seal off the second high-pressure channel space 6b from the adjacent spaces on both sides thereof (the space 50 and the space 51 between the fourth and fifth high-pressure seal rings 4d and 4e).

The fifth and sixth high-pressure seal rings 4e and 4f are also disposed in symmetry, with the open sides of the annular grooves 43 thereof facing each other with the third high-pressure channel space 6c in between, and seal off the third high-pressure channel space 6c from the adjacent spaces on both sides thereof (the space 51 and the space 52 in which the bearings 22 are disposed).

On the other hand, two low-pressure seal rings that seal each of the low-pressure channel spaces 5a and 5b are disposed in symmetry, with the annular grooves 43 thereof opening into the adjacent spaces on either side of the low-pressure channel space 5, so that the layout is reversed from that of the high-pressure seal rings.

More specifically, as shown in FIG. 2, the first and second low-pressure seal rings 3a and 3b are disposed in a state in which the open sides of the annular grooves 43 thereof face into the adjacent spaces on either side of the first low-pressure channel space 5a (the space 53 in which the bearings 21 are disposed, and the space 54 in which the first annular member 25 is mounted, which is the space between the second and third low-pressure seal rings 3b and 3c), and seal off the first low-pressure channel space 5a and its adjacent spaces 53 and 54.

As shown in FIGS. 3 and 5, the third and fourth low-pressure seal rings 3c and 3d are disposed in a state in which the open sides of the annular grooves 43 thereof face into the adjacent spaces on either side of the second low-pressure channel space 5b (the space 54 and the first high-pressure channel space 6a), and seal off the second low-pressure channel space 5b and its adjacent spaces 6a and 54.

The second low-pressure channel space 5b and the first high-pressure channel space 6a are adjacent to each other, and the first high-pressure seal ring 4a and the fourth low-pressure seal ring 3d sealing the channel spaces 5b and 6a are disposed so that the open sides of the annular grooves 43 thereof are facing in the same direction; and since the layout is the same, the elastic seal rings 3d and 4a serve double duty. The spaces 50, 51, 52, 53 and 54 adjacent to the channel spaces 5a and 5b and 6a through 6c (excluding the second low-pressure channel space 5b and first high-pressure channel space 6a that are mutually adjacent spaces) are atmospheric pressure spaces.

As seen from FIGS. 1 to 5, the channels 7 and 8 are respectively a series of passages that connect stationary passages 55, 56, 57, 58 and 59 to the rotary passages 60, 61, 62, 63 and 64 via the channel spaces 5a and 5b and 6a through 6c so as to allow rotatable communication therebetween. In this structure, the stationary passages 55, 56, 57, 58 and 59 penetrate through the joint housing 1 from the outer peripheral surface thereof into the channel spaces 5a and 5b and 6a through 6c; and the rotary passages 60, 61, 62, 63 and 64 are provided in the rotator 2 so as to extend from the channel spaces 5a and 5b and 6a through 6c to the end face of the attachment flange 23.

The stationary passages 55, 56, 57, 58 and 59 respectively pass through the third joint housing section 13, the fourth joint housing section 14, the fifth joint housing section 15 and the second annular member 28, the sixth joint housing section 16 and the third annular member 31, and the seventh joint housing section 17 and the fourth annular member 34.

Hereinafter, the low-pressure channels 7 that communicate with the first and second low-pressure channel spaces 5a and 5b will be referred to as the "first low-pressure channel 7a" and the "second low-pressure channel 7b," respectively. The high-pressure channels 8 that communicate with the first, second, and third high-pressure channel spaces 6a, 6b and 6c will be referred to as the "first high-pressure channel 8a," the "second high-pressure channel 8b," and the "third high-pressure channel 8c,"respectively.

In the above structure, the low-pressure channels 7 (7a and 7b) are used as vacuum suction routes, and the high-pressure channels 8 (8a through 8c) are used as pressurized air supply routes for compressed air or the like. More specifically, when the rotary joint is mounted in an arm joint, the stationary passages 55 and 56 in the low-pressure channels 7 are connected to a vacuum pump, and the rotary passages 60 and 61 are connected to a vacuum chucking device for holding wafers. In the high-pressure channels 8, the stationary passages 57, 58 and 59 are connected to an air compressor or another such pressurized fluid supply device, and the rotary passages 62, 63 and 64 are connected to a fluid device such as a cylinder for arm position manipulation and control.

As shown in FIG. 1, the electrical wire passage hole 9 penetrates through the joint housing 1 and rotator 2 along the axis of the rotator 2, and an electrical wire is inserted into this hole for conducting electricity to electrical and electronic devices for operating or controlling arm movement and so forth, or for sending electrical signals. A rotary connector 70 is disposed in the relative rotational portion of the electrical wire passage hole 9, so that tangling and twisting of electrical wires or cables by the relative rotation of the joint housing 1 and rotator 2 are effectively prevented.

More specifically, the rotary connector 70 is a known component comprising a rotary connector portion consisting of a casing 71 and a first connector 72 fixed to the casing 71, and a stationary connector portion consisting of a second connector 73 rotatably attached to the casing 71. The electrical wire or cable 74 connected to the first connector 72 can be properly connected to the electrical wire or cable 75 connected to the second connector 73, regardless of the relative rotation of the joint housing 1 and rotator 2.

In the multi-channel rotary joint structured as described above, the vacuum suction produced by the low-pressure channels 7 (7a and 7b) and the supply of high-pressure fluid by the high-pressure channels 8 (8a through 8c) can be achieved without the problems discussed above.

More specifically, the high-pressure channel spaces 6 (6a through 6c), which are the relative rotational portions of the high-pressure channels 8 (8a through 8c), are higher in pressure (positive pressure) than the spaces adjacent thereto, namely, the atmospheric pressure spaces 50, 51 and 52, or the second low-pressure channel space 5b, which is a negative pressure space. However, the high-pressure seal rings 4a through 4f that seal the high-pressure channel spaces 6a through 6c are disposed in a state in which the annular grooves 43 between the inner and outer peripheral lips 41 and 42 thereof open into the high-pressure channel spaces 6 (6a through 6c). Accordingly, the proper sealing function by the high-pressure seal rings 4 (4a through 4f) can be always achieved, even when the fluid flowing through the high-pressure channels 8 (8a through 8c) is high in pressure, or when there are pressure fluctuations.

For instance, in the first high-pressure channel space 6a, if a pressurized fluid is supplied to the first high-pressure channel 8a, as shown in FIG. 5, this fluid will flow into the annular grooves 43 of the first and second high-pressure seal rings 4a and 4b that open into the first high-pressure channel space 6a. In the axial direction, the pressure of the fluid presses the seal rings 4a and 4b apart and presses the main bodies 40 against the side surfaces of the annular recesses 29 and 30; while in the radial direction, the inner and outer peripheral lips 41 and 42 of the seal rings 4a and 4b are pressed and deformed so that they spread apart in the radial direction.

More specifically, the pressure of the fluid flowing into the annular grooves 43 raises the contact surface pressure of the seal rings 4a and 4b against the sealing surfaces 47 and 48 of the seal components 45 and 46, and the sealing function of the first and second high-pressure seal rings 4a and 4b is sufficiently manifested. How much this contact surface pressure is raised is a function of the pressure of the fluid supplied to the first high-pressure channel space 6a. Therefore, the above-described contact surface pressure, that is, the sealing pressure, varies in proportion to the pressure of the fluid supplied to the first high-pressure channel 8a; and even if this fluid is high in pressure, or if there are pressure fluctuations, the sealing function of the first and second high-pressure seal rings 4a and 4b will be properly and favorably manifested, and the supply of pressurized fluid by the first high-pressure channel 8a will be carried out as desired without any leakage.

The above self-sealing action provided by the high-pressure seal rings 4 (4a and 4b) is performed in exactly the same way with the third and fourth high-pressure seal rings 4c and 4d that seal the second high-pressure channel space 6b, and with the fifth and sixth high-pressure seal rings 4e and 4f that seal the third high-pressure channel space 6c. In addition, the supply of pressurized fluid by the second and third high-pressure channels 8*b* and 8*c* is also carried out favorably without any leakage.

The low-pressure channel spaces 5 (5*a* and 5*b*), which are the relative rotational portions of the low-pressure channels 7 (7*a* and 7*b*), are lower in pressure (negative pressure) than the spaces adjacent thereto, namely, the atmospheric pressure spaces 53 and 54, or the first high-pressure channel space 6*a*, which is a positive pressure space. However, the low-pressure seal rings 3 (3*a* through 3*d*) that seal the low-pressure channel spaces 5*a* and 5*b* are disposed in a state in which the annular grooves 43 between the inner and outer peripheral lips 41 and 42 thereof open into the first high-pressure channel space 6*a* and the spaces 53 and 54 of atmospheric or higher pressure. Accordingly, the proper sealing function by the low-pressure seal rings 3 (3*a* through 3*d*) can be always achieved, regardless of the degree of negative pressure (degree of vacuum suction) in the low-pressure channels 7 or fluctuations therein.

For instance, in the second low-pressure channel space 5*b*, if the second low-pressure channel 7*b* is used as a vacuum suction route, as shown in FIG. 5, in the axial direction the third and fourth low-pressure seal rings 3*c* and 3*d* will be drawn closer together and the main bodies 40 will be pressed against the side surfaces of the annular recesses 27 and 29, while in the radial direction the inner and outer peripheral lips 41 and 42 of the seal rings 3*c* and 3*d* are deformed by suction so that they spread apart in the radial direction, and the contact surface pressure against the sealing surfaces 47 and 48 of the seal components 45 and 46 rises. Thus, the sealing function of the third and fourth low-pressure seal rings 3*c* and 3*d* is sufficiently manifested. How much this contact surface pressure is raised is a function of the degree of negative pressure in the second low-pressure channel space 5*b*.

Therefore, the above contact surface pressure, that is, the sealing pressure, varies in proportion to the vacuum suction force imparted via the second low-pressure channel space 5*b*. Even if the vacuum suction force is high, or if there are fluctuations, the sealing function of the third and fourth low-pressure seal rings 3*c* and 3*d* will be properly and favorably manifested, and the vacuum suction action of the second low-pressure channel 7*b* will be favorably achieved. This self-sealing action provided by the low-pressure seal rings 3 (3*a* through 3*d*) is performed in exactly the same way with the first and second low-pressure seal rings 3*a* and 3*b* that seal the first low-pressure channel space 5*a*, and the vacuum suction action of the first low-pressure channel 7*a* is also achieved favorably.

As seen from the above, with the multi-channel rotary joint of the present invention, a plurality of positive pressure fluid routes and negative pressure fluid routes can be connected favorably between the power source arm member and the working arm member that make up the arm joint. Furthermore, since the elastic seal rings 3 (3*a* through 3*d*) and 4 (4*a* through 4*f*) are used as the sealing means for the channels 7 and 8, unlike when mechanical seals are used, numerous channels 7 and 8 can be provided without making the rotary joint any larger than necessary, and the rotational resistance and load between the arm members can be reduced.

Also, the low-pressure seal rings 3 (3*a* through 3*d*) and the high-pressure seal rings 4 (4*a* through 4*f*) are formed into common members that have the same structure, and the low-pressure seal rings 3 (3*a* through 3*d*) and the high-pressure seal rings 4 (4*a* through 4*f*) that have different sealing functions (in the above example, the fourth low-pressure seal ring 3*d* and the first high-pressure seal ring 4*a*) are designed so as to serve double duty. Accordingly, the rotary joint can be made even more compact and simple.

In addition, good electrical connection can be achieved between arm members by providing the electrical wire passage hole 9 and the rotary connector 70.

With use of the multi-channel rotary joint of the present invention, it is possible to greatly enhance the performance and capacity of an industrial robot used, for instance, as a wafer conveyance means in a semiconductor manufacturing apparatus.

Because the joint housing 1 is designed so that it can be disassembled into a plurality of housing sections 11, 12, 13, 14, 15, 16, 17, 25, 28, 31 and 34, the installation and replacement of the bearings 21 and 22 or the elastic seal rings 3 (3*a* through 3*d*) and 4 (4*a* through 4*f*) can be performed easily; and the assembly, maintenance, and inspection of this rotary joint can be carried out easily and efficiently.

Furthermore, the fifth and sixth joint housing sections 15 and 16 and the second to fourth annular members 28, 31 and 34 are common members with the same structure, thus the cost of manufacturing the rotary joint will be reduced. Also, the low-pressure seal rings 3 (3*a* through 3*d*) and the high-pressure seal rings 4 (4*a* through 4*f*) are common members and differ only in their layout, thus the joint housing structural members consisting of a combination of the fifth joint housing section 15 and the third annular member 31 (or the sixth joint housing section 16 and the fourth annular member 34) can be used as the structural members of not only the high-pressure channels 8 but also the low-pressure channels 7; the number of low-pressure channels 7 or high-pressure channels 8 can be freely increased or decreased by increasing or decreasing the number of the joint housing structural members that are installed.

Also, the low-pressure channels 7 can be easily changed into high-pressure channels 8, or vice versa, by changing the layout of the elastic seal rings 3 (3*a* through 3*d*) and 4 (4*a* through 4*f*) (reversing their orientation in the axial direction). This allows a single rotary joint to be used as a multipurpose device with many different applications.

The present invention is not limited to the embodiments given above. The present invention can be improved or changed as desired within the scope of the basic principles of the present invention.

In other words, the number of low-pressure channel spaces 5*a* and 5*b* and high-pressure channel spaces 6*a* through 6*c* and their layout can be varied as desired. For example, when a plurality of low-pressure channel spaces 5*a* and 5*b* and a plurality of high-pressure channel spaces 6*a* through 6*c* are provided, the low-pressure channel spaces 5*a* and 5*b* and high-pressure channel spaces 6*a* through 6*c* can be disposed alternately so that they become mutually adjacent spaces. With this layout, all of the elastic seal rings in the elastic seal ring group, except for those located at the ends, can be used both as low-pressure seal rings and as high-pressure seal rings. As a result, the number of elastic seal rings needed can be halved. Also, the low-pressure channels 7 are used as vacuum suction routes in the above embodiment, but the low-pressure channels 7 can also be used as supply routes for a positive pressure fluid, on the condition that the pressure of the low-pressure channel spaces 5, which are the relative rotational portions thereof, is lower than that in the adjacent spaces. For instance, if the pressure P (the lowest pressure when there is pressure fluctuation) of the adjacent spaces (including the high-pressure channel spaces 6) is a positive pressure, then even when the low-pressure channels 7 are used as a supply routes for a fluid with a positive pressure Q (<P), the low-pressure channel spaces 5a and 5b will provide the same sealing function as that described above by means of the low-pressure seal rings 3.

Figure 7:
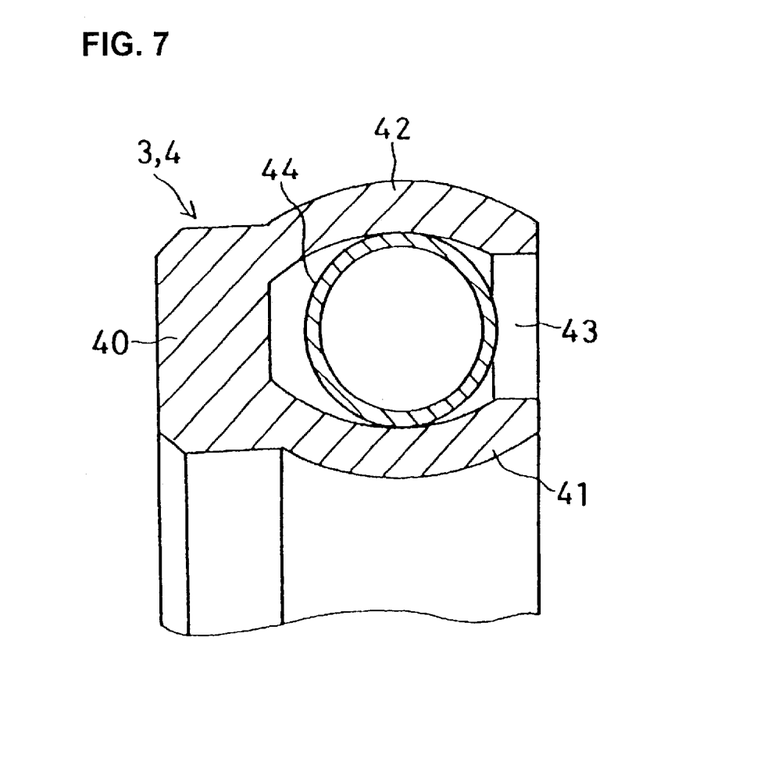
FIG. 7 is a vertical cross sectional side view of a part of another type of elastic seal ring used in the rotary joint of the present invention.

The shape and structure of the elastic seal rings 3 (3a through 3d) and 4 (4a through 4f) can also be suitably modified and improved according to the sealing conditions and so forth. For instance, as shown in FIG. 7, the inner and outer peripheral lips 41 and 42 can be curved and a coil spring used as the spring member 44 installed in the annular groove 43.

What is claimed is:

1. A multi-channel rotary joint comprising:

a joint housing;

a rotator rotatably installed in said joint housing;

a plurality of elastic seal rings disposed in a row in an axial direction of said rotator so as to be between opposing peripheral surfaces of said joint housing and said rotator, each of said plurality of elastic seal rings being comprised of an annular main body and cylindrical inner and outer peripheral lips that protrude axially from said annular main body and are brought into an elastically pressing contact with said opposing peripheral surface;

a low-pressure channel space and a high-pressure channel space formed between said opposing peripheral surfaces and sealed by two opposing elastic seal rings of said plurality of elastic seal rings, wherein two opposing elastic seal rings that seal said low-pressure channel space are engaged with and supported by one of said opposing peripheral surfaces such that annular grooves between inner and outer peripheral lips of said two opposing elastic seal rings are disposed symmetrically and open into spaces adjacent to said low-pressure channel space, and two opposing elastic seal rings that seal said high-pressure channel space are engaged with and supported by one of said opposing peripheral surfaces such that annular grooves between inner and outer peripheral lips of said two opposing elastic seal rings are disposed symmetrically and open into said high-pressure channel space;

a low-pressure channel and a high-pressure channel provided between said joint housing and said rotator, wherein a fluid lower in pressure than a space adjacent to said low-pressure channel space flows into said low-pressure channel that communicates with said low-pressure channel space, and a fluid higher in pressure than a space adjacent to said high-pressure channel space flows into said high-pressure channel that communicates with said high-pressure channel space; and said low-pressure channel is a vacuum suction route, and said high-pressure channel is a pressurized fluid supply route.

2. A multi-channel rotary joint according to claim 1, wherein at least one low-pressure channel space is disposed adjacent to said high-pressure channel space, and said two opposing elastic seal rings that seal said low-pressure channel space are used also as elastic seal rings at seal said high-pressure channel space.

3. A multi-channel rotary joint according to claim 1, wherein an electrical wire passage hole is provided so as to go through on an axis of said rotator and to pass through said joint housing and rotator.

4. A multi-channel rotary joint according to claim 3, wherein a rotary connector for connecting electrical wiring is disposed in said electrical wire passage hole.

* * * * *